(12) United States Patent
Dedio

(10) Patent No.: US 6,702,189 B2
(45) Date of Patent: Mar. 9, 2004

(54) AUXILIARY HEATER FOR A MOTOR VEHICLE WITH DETECTION OF A SAFETY-CRITICAL STATE

(75) Inventor: Horst Dedio, Wolfratshausen (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 0 days.

(21) Appl. No.: 10/147,303

(22) Filed: May 17, 2002

(65) Prior Publication Data
US 2002/0190133 A1 Dec. 19, 2002

(30) Foreign Application Priority Data
May 25, 2001 (DE) .......................... 101 25 591

(51) Int. Cl.⁷ ................................................ B60H 1/02
(52) U.S. Cl. .................................. 237/12.3 C; 165/41
(58) Field of Search ................. 237/12.3 C, 12.3 A, 237/12.3 B; 165/41, 42

(56) References Cited

U.S. PATENT DOCUMENTS

| 4,411,385 A | * | 10/1983 | Lamkewitz | 237/2 A |
| 4,513,911 A | * | 4/1985 | Sanchez | 237/12.3 C |
| 4,583,072 A | * | 4/1986 | Matsushita | 340/457 |
| 4,946,097 A | * | 8/1990 | Kawamura | 237/2 A |
| 5,178,323 A | * | 1/1993 | Hanson | 237/2 A |
| 5,632,443 A | * | 5/1997 | Quarrie | 237/12.3 C |
| 6,175,782 B1 | * | 1/2001 | Obradovich et al. | 701/1 |
| 6,176,259 B1 | * | 1/2001 | Harde et al. | 137/587 |

FOREIGN PATENT DOCUMENTS

DE 196 15 319 C1 3/1997

* cited by examiner

Primary Examiner—Derek Boles
(74) Attorney, Agent, or Firm—Nixon Peabody LLP; David S. Safran

(57) ABSTRACT

An auxiliary heater for a motor vehicle equipped with a control device for controlling the operation of the auxiliary heater. In order to increase passenger protection in the motor vehicle, the control device is set up to detect a signal from at least one vehicle safety sensor, using the signal to detect the safety-critical state of the vehicle, and depending upon this detected status, ceases operation of the auxiliary heater.

9 Claims, 1 Drawing Sheet

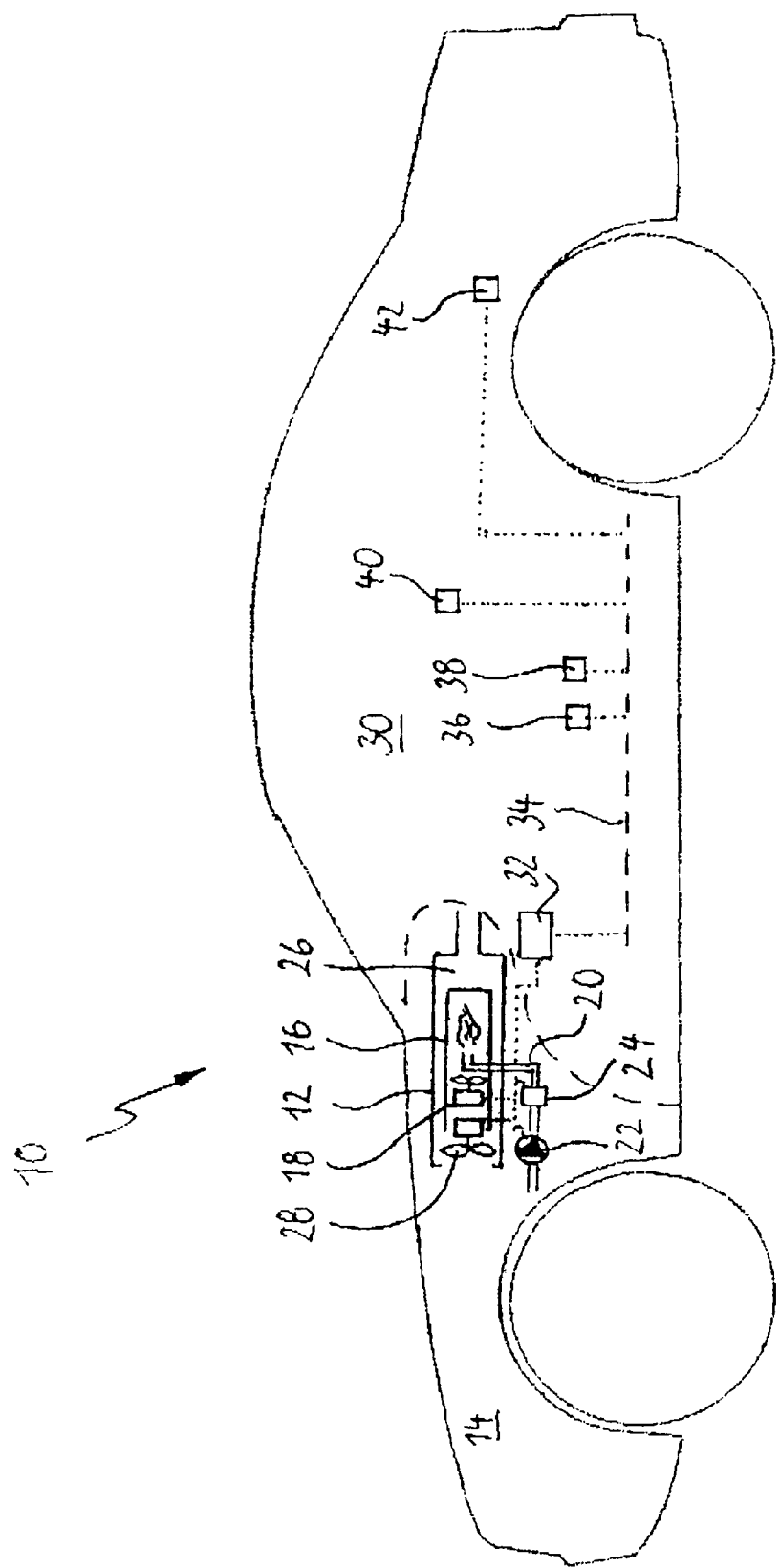

the automotive manufacturers with respect to signal exchange are often standardized by

AUXILIARY HEATER FOR A MOTOR VEHICLE WITH DETECTION OF A SAFETY-CRITICAL STATE

BACKGROUND OF THE INVENTION

1. Field of the Invention

The invention relates to an auxiliary heater for a motor vehicle with a control device for controlling the operation of the auxiliary heater. Furthermore, the invention relates to a motor vehicle with one such auxiliary heater, and a process for control of one such auxiliary heater.

2. Description of Related Art

Heaters of this type are generally used to heat the air of the passenger compartment or to heat the cooling water of an internal combustion engine. In the former case, it is a so-called air heater, in the latter case, a water heater.

In recent years, in vehicles, especially motor vehicles, it has been possible to greatly improve passenger protection. The reason for improvements is essentially that on the one hand it has been possible to detect an accident with electronic aids within milliseconds and on the other to make available active protection systems which instantaneously protect the passengers against the external effects caused by an accident. Active protection systems are mainly automatic belt tighteners and airbags, i.e., inflatable bodies with a pyrotechnic gas generator which exist in the meantime in diverse versions.

German Patent DE 196 15 319 C1 discloses an air conditioning system of a motor vehicle with an evaporator in which, in the case of accident-induced damage to the evaporator, a quick closure closes the air channel which leads from the evaporator to the passenger compartments. The quick closure is preferably a small airbag.

The triggering mechanism for this small airbag can be the same as is used in airbags for passenger protection. However, in this air conditioning system, the actual escape of vapors cannot be prevented.

SUMMARY OF THE INVENTION

The object of the invention is to increase passenger protection in motor vehicles which are equipped with an auxiliary heater.

This object is achieved in accordance with the invention in that the initially-mentioned type of auxiliary heater is provided with a control device that detects a signal from at least one motor vehicle safety sensor, uses the signal to detect a safety-critical status of the vehicle, and depending upon this detected state, ceases operation of the auxiliary heater. The object is furthermore achieved with a motor vehicle in which such an auxiliary heater is installed. Finally, the object is also achieved with a process for controlling such an auxiliary heater in a vehicle with the following steps: detecting the safety status of the vehicle and controlling the auxiliary heater depending upon the detected status.

The expression "vehicle safety sensors," within the framework of this specification, encompasses those mechanisms which enable a statement about the safety of the vehicle. They are especially mechanisms which are capable of determining a location, speed and acceleration or braking, rotational or tilting behavior, safety-critical ambient conditions or the status of individual assemblies of the motor vehicle.

The invention is based upon the finding that, in case of an accident of a vehicle with a auxiliary heater, the heater can cause various hazardous conditions. First, there is a danger that a fault will occur in the control of the auxiliary heater, by which the auxiliary heater in an extreme case can become overheated and damaged or destroyed. Furthermore, there is the danger that the flame burning in the auxiliary heater will ignite flammable fuels in the motor vehicle or in the surrounding area of the motor vehicle. This danger is especially high when fuel which is generally highly flammable or explosive has escaped in an accident.

These dangers are averted in the auxiliary heater in accordance with the invention by immediately ceasing the operation of the auxiliary heater upon detection of an accident involving the motor vehicle. In particular, the auxiliary heater is turned off or actuating the heater is prevented. Thus, danger to the passengers of the motor vehicle originating from the auxiliary heater in case of an accident can be prevented.

In accordance with the invention, not only is an accident-induced effect (fire or explosion) on the passengers prevented, but also the accident-induced effect itself is prevented. The major danger in an auxiliary heater originates from the flame burning in the device. By stopping this flame in accordance with the invention, before serious damage to the auxiliary heater can occur due to an accident, it is ensured that the auxiliary heater in the accident does not increase the danger of an explosion as a result of escaped fuel.

In one exemplary embodiment of the invention, the auxiliary heater includes a fuel feed with a shut-off device and the control device is set up to actuate the shut-off device immediately when a safety-critical state is detected. The shut-off device can be, for example, a solenoid valve in a fuel delivery line. Alternatively, or in addition to interrupting the fuel feed in accordance with the invention, the ignition mechanism which is generally present in conventional auxiliary heaters is immediately shut down when an accident is detected.

Even when the fuel supply of the auxiliary heater is ceased, due to so-called afterburning, there is still considerable development of heat, and thus, further danger to the passengers. This hazard is prevented in another exemplary embodiment of the invention in which the auxiliary heater is provided with a combustion air feed and a control device is provided to immediately extinguish the flame in the auxiliary heater by way of the combustion air feed when a safety-critical status is detected.

The safety function of the auxiliary heater in accordance with the invention can be implemented especially economically by setting up the control device of the auxiliary heater to detect the signal of the motor vehicle safety sensor via a control device of the motor vehicle safety system, for example, a belt tightener. These safety systems are often standard equipment in conventional motor vehicles, and therefore, do not lead to additional costs. The control devices with respect to signal exchange are often standardized by so-called interface protocols. Therefore, there is almost no additional cost when the control device of the auxiliary heater developed in accordance with the invention is installed.

To detect an accident of a vehicle which employs the auxiliary heater in accordance with the invention, in an especially economical manner a position sensor, an acceleration sensor and/or an rpm sensor of the motor vehicle can be used. Alternatively, or in addition, the auxiliary heater itself can be provided with one such sensor.

Moreover, the safety of the motor vehicle can be improved by using a tank cap sensor of the motor vehicle as a vehicle safety sensor. The tank cap sensor detects when the vehicle is being refueled, and is therefore in the state during which there is in turn an increased explosion risk.

Exchange of signals between the sensors and the control device of the auxiliary heater can take place especially economically according to one development of the invention via the vehicle data bus which is present anyway in the vehicle.

One embodiment of a motor vehicle auxiliary heater in accordance with the invention is explained below with reference to the accompanying drawings.

BRIEF DESCRIPTION OF THE INVENTION

The sole FIGURE shows a vehicle in accordance with the invention with an auxiliary heater.

DETAILED DESCRIPTION OF THE INVENTION

The vehicle 10 shown in FIG. 1 is provided with an auxiliary heater 12 located in the engine compartment 14 of the vehicle 10. The auxiliary heater 12 includes a burner 16 which receives a combination of combustion air from a combustion air fan 18 and liquid fuel from a fuel line 20 by way of the fuel pump 22. The fuel line 20 includes a solenoid valve 24 downstream of the fuel pump 22 for shutting off flow through the pump, and thus, entry of fuel to the auxiliary heater 12. Downstream of the burner 16 is a heat exchanger 26 in which the heat from a liquid or gaseous heat transfer medium is transferred to hot air. The hot air is conveyed with a hot air fan 28 into the passenger compartment 30. The auxiliary heater 12 is provided with a control device 32 which is electronically connected to the combustion air fan 18, fuel pump 22, solenoid valve 24 and hot air fan 28.

In the motor vehicle 10, a data bus 34 in the form of a CAN bus is electronically connected to the control device 32. Furthermore, the motor vehicle 10 is provided with a plurality of sensors for sensing an operation condition of the vehicle 10, for example, at least one of a position sensor 36, an acceleration sensor 38, an rpm sensor 40 and a tank cap sensor 42. Each position sensor 36, the acceleration sensor 38, the rpm sensor 40 and the tank cap sensor 42 may be each electronically connected to the data bus 34 so as to send a signal to the motor vehicle 10 about the safety status of the motor vehicle 10 through the data bus 34. Thus, for example, acceleration of the vehicle 10 or an impact is immediately recognized and reported. The tank cap sensor 42 reports when the tank cap is open; this generally means that the motor vehicle 10 is being fueled or fuel for the auxiliary heater 12 is being supplied. The control device 32 determines and evaluates the signals of the position sensor 36, acceleration sensor 38, rpm sensor 40 and tank cap sensor 42 when a safety-critical status of the motor vehicle 10 is detected. In another embodiment, the evaluation of the signals of the safety sensors may be transmitted to the safety system control device of the vehicle 10, such as, for example, an airbag of a belt tightener which is directly coupled to the control device of the auxiliary heater 12.

If the control device 32 detects a safety-critical status, it instantaneously ceases operation of the auxiliary heater 12. In doing so, especially the solenoid valve 24 is actuated, and thus, the fuel feed line 20 is closed. Moreover, a flame in the burner 16 is extinguished by immediately stopping operation of the combustion air fan 18.

Since the control device 32 shuts down the auxiliary heater 12 within a very short time frame or prevents starting of the auxiliary heater 12, in the case of an accident of the vehicle, there is no danger that the flame will ignite combustible substances in the auxiliary heater 12 in the vehicle 10 or escaping fuel. It is also ensured that the auxiliary heater 12 itself is not overheated. If an accident should not occur, there is no damage. The auxiliary heater 12 can be easily restarted after a certain time interval and especially after the safety state of the vehicle has been re-checked.

What is claimed is:

1. An auxiliary heater for a motor vehicle having a plurality of safety sensors for sensing a respective operating condition of the motor vehicle, said auxiliary heater comprising:

a control device for controlling operation of the auxiliary heater, said control device being in electronic communication with the plurality of safety sensors to receive a signal therefrom to detect safety-critical states of the motor vehicle, and to cease operation of the auxiliary heater upon detection of a safety-critical state, wherein said auxiliary heater further comprises a combustion air feed for providing combustion air to said auxiliary heater, said combustion air feed being controlled by said control device so as to interrupt a flow of combustion air from said combustion air feed to said auxiliary heater immediately upon detection of a safety-critical state.

2. The auxiliary heater as claimed in claim 1, wherein said auxiliary heater further comprises a fuel feed for providing fuel to said auxiliary heater, said fuel feed having a shut-off means for preventing entry of fuel to said auxiliary heater, said shut-off means being controlled by said control device so as to become actuated immediately upon detection of a safety-critical state.

3. The auxiliary heater as claimed in claim 1, wherein said plurality of safety sensors comprises at least one of a position sensor, an acceleration sensor, an rpm sensor and a tank cap sensor.

4. The auxiliary heater as claimed in claim 3, wherein said control device is in electronic communication with a safety system control device for the motor vehicle so as to receive a signal from at least one of the position sensor, the acceleration sensor, the rpm sensor and the tank cap sensor via the safety system control device.

5. The auxiliary heater as claimed in claim 3, wherein said control device is in electronic communication with a data bus of the motor vehicle so as to receive a signal from at least one of the position sensor, the acceleration sensor, the rpm sensor and the tank cap sensor via the data bus.

6. A motor vehicle comprising:

a plurality of safety sensors for sensing an operating condition of said motor vehicle; and an auxiliary heater for providing heat to a compartment area of said motor vehicle, said auxiliary heater including a control device for controlling operation of the auxiliary heater, said control device being in electronic communication with the plurality of safety sensors to receive a signal therefrom to detect safety-critical states of the motor vehicle, and to cease operation of the auxiliary heater upon detection of a safety-critical state, wherein said auxiliary heater further comprises a combustion air feed for providing combustion air to said auxiliary heater, said combustion air feed being controlled by said control device so as to interrupt a flow of combustion air from said combustion air feed to said auxiliary heater immediately upon detection of a safety-critical state.

7. The motor vehicle as claimed in claim 6, wherein said plurality of safety sensors comprises at least one of a position sensor, an acceleration sensor, an rpm sensor and a tank cap sensor.

8. The motor vehicle as claimed in claim 7, further comprising a safety system control device in electronic communication with said control device, said safety system control device being adapted to receive signals from at least one of said position sensor, said acceleration sensor, said rpm sensor and said tank cap sensor and to send said signals to said control device.

9. The motor vehicle as claimed in claim 7, further comprising a data bus in electronic communication with said control device, said data bus being adapted to receive signal from at least one of said position sensor, said acceleration sensor, said rpm sensor and tank cap sensor and to send said signals to said control device.

* * * * *